April 14, 1931.                    R. STAR                    1,801,212
                                  TANK GAUGE
                              Filed March 31, 1928        2 Sheets-Sheet 1
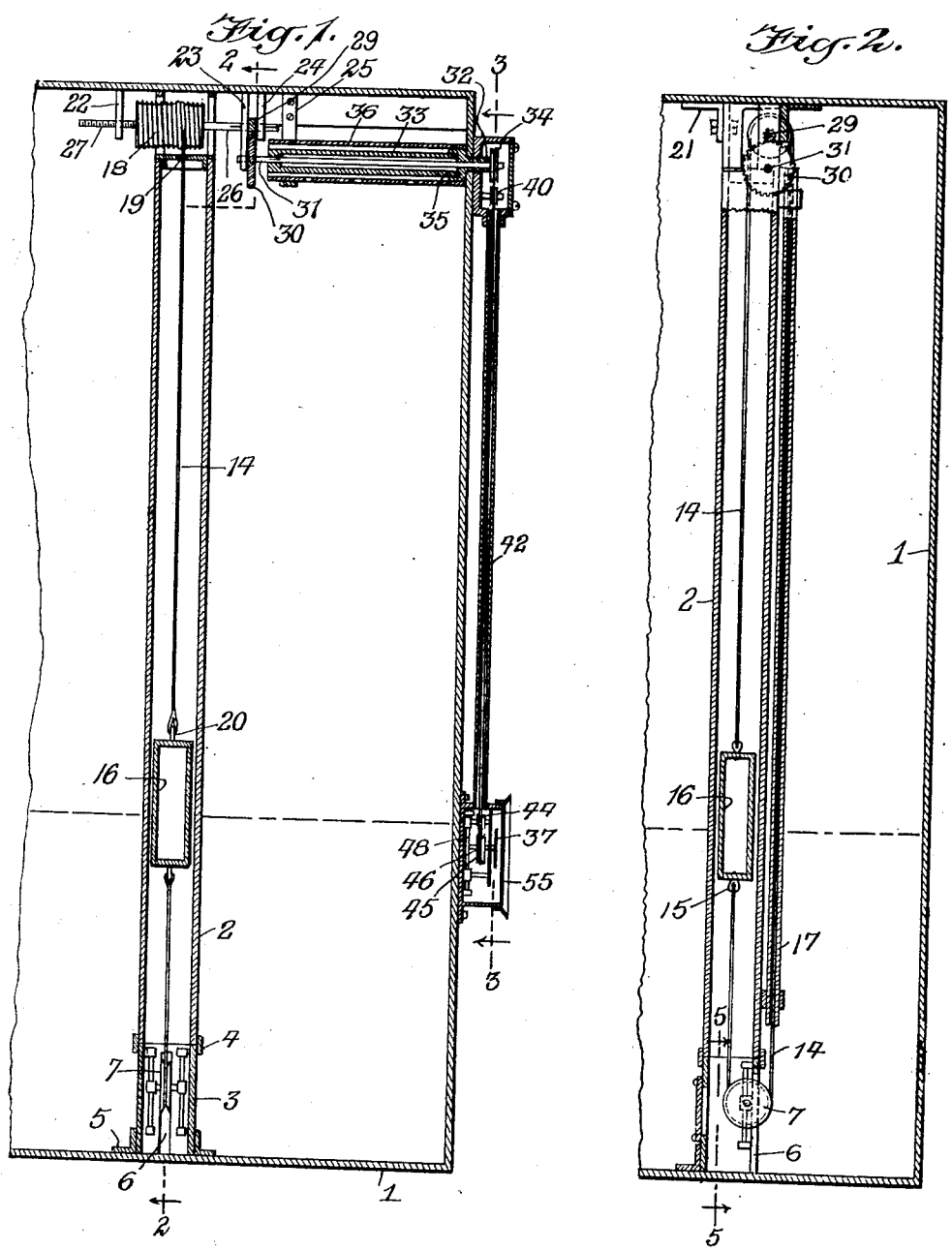

April 14, 1931.   R. STAR   1,801,212
TANK GAUGE
Filed March 31, 1928   2 Sheets-Sheet 2
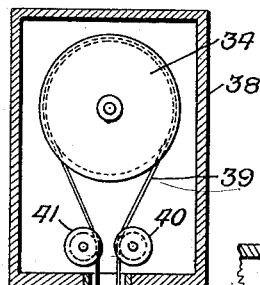
Fig. 3.
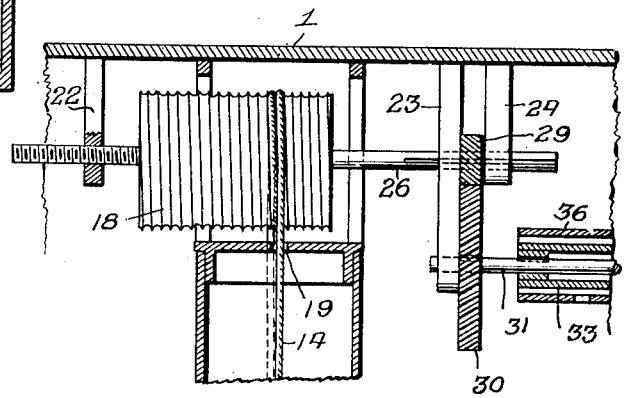
Fig. 4.
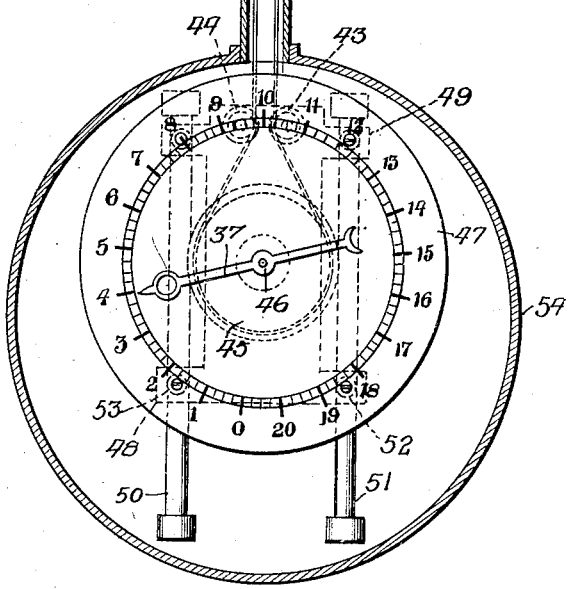
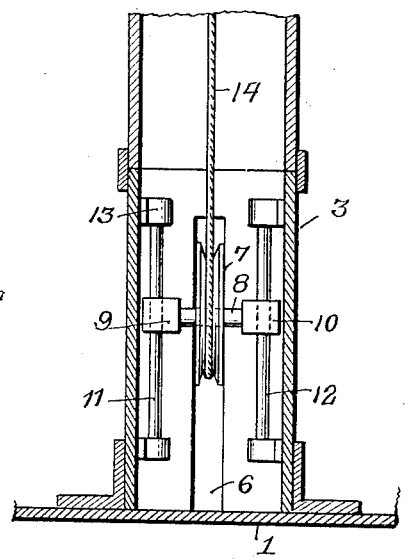
Fig. 5.
WITNESSES
Geo. W. Naylor
A. L. Kitchin
INVENTOR
Richard Star
BY
Munn & Co.
ATTORNEY Patented Apr. 14, 1931

1,801,212

UNITED STATES PATENT OFFICE

RICHARD STAR, OF BROOKLYN, NEW YORK

TANK GAUGE

Application filed March 31, 1928. Serial No. 266,199.

This invention relates to gauges for tanks, and particularly to an improved gauge for comparatively large, deep tanks for use on ships and other places, the object being to provide an improved construction which will show the level of the liquid in the tank at all times.

Another object of the invention is to provide a tank gauge for the tanks of ships, wherein the parts are so formed that the mean level of the liquid in the tank will be indicated regardless of the rolling of the ship.

An additional object is to provide a gauge wherein the indicating dial and associated pointer are placed at a distant point from the power means which actuate the same, the arrangement being such that the stretch or contraction of the power transmitting means is automatically taken care of.

In the accompanying drawings,—

Figure 1 is a sectional view through a tank disclosing an embodiment of the invention;

Figure 2 is a sectional view through Figure 1, approximately on the line 2—2;

Figure 3 is an enlarged fragmentary sectional view through Figure 1, approximately on the line 3—3;

Figure 4 is an enlarged fragmentary sectional view showing on a large scale part of the mechanism illustrated at the top of Figure 1;

Figure 5 is an enlarged fragmentary sectional view through Figure 2, approximately on the line 5—5.

Referring to the accompanying drawings by numerals, 1 indicates a tank adapted to contain liquid. On steamships and other places large tanks are used for carrying fuel oil and other liquids. On a steamship using oil it is very desirable that the engineer shall know how much oil there is in each tank, and some of these tanks are very deep, as, for instance, twenty or thirty feet deep. Also, in tanks carrying fuel burning oil it has been found that a large number of different oils are used having different specific gravity and different viscosity. Heretofore different kinds of gauges have been provided but special means were necessary to make them indicate properly with the different kinds of oils. In the present invention the gauge will correctly operate with any kind of oil and will always show the true level of the oil, regardless of its viscosity or specific gravity. As indicated particularly in Figure 1, tank 1 is provided with a pipe 2 extending from the top to near the bottom. At the bottom a tubular socket 3 is provided which is really an extension of the pipe and is connected to the pipe by a suitable band 4. This band may be threaded onto the pipe 2 and socket 3 or otherwise secured, as desired. Socket 3 is connected with the bottom of the tank 1 by suitable brackets 5 which may be welded, riveted or otherwise secured to the socket and welded, riveted or otherwise secured to the tank. This socket is provided with a slot 6 whereby oil may pass from tank 1 into pipe 2. As indicated in Figure 2 a pulley 7 extends a short distance through slot 6, said pulley being mounted on a journal pin 8, as shown in Figure 5. This pin is carried preferably by blocks 9 and 10 slidably mounted on the guide rods 11 and 12, which guide rods are rigidly secured to socket 3 and by a number of supporting brackets 13. In this way the weight of pulley 7 continually gives the blocks 9 and 10 a tendency to move downwardly, thus putting a strain on the cable 14. This cable may be wire or other material and at one end is secured to the fixture 15 connected in any desired manner with the float 16. From the fixture 15 the cable 14 extends downwardly around pulley 7 through slot 6 and upwardly through the guide pipe 17 to the drum 18 around the drum 18 one or more times and down through the aperture 19 into the upper part of the pipe 2. This cable extends downwardly and is secured to the fixture 20 carried at the upper end of the float 16. Float 16 may be glass, metal or other material and loosely fits in pipe 2, whereby as it moves upwardly and downwardly when the level of the oil changes, cable 14 will be pulled for rotating the drum 18, while pulley 7 by its weight keeps the cable taut. As the only entrances to the pipe 2 are the openings 6 and 19, said pipe will have the level of oil therein equal to the level of oil in tank 1, but in case tank 1 should move as the ship tosses, the splashing and movement of the oil in tank 1 will have little or no effect on the level of oil in pipe 2. However, as the level of the oil actually moves downwardly, the level of oil in pipe 2 will move downwardly. It is, of course, understood that the reverse is true and when the tank is being filled the float 16 will move upwardly as the level of the oil moves upwardly. The upper end of the pipe 20 is connected to the pipe 1 in any suitable manner, as for instance, by brackets 21. As indicated in Figure 1, supporting brackets 22, 23, 24 and 25 are provided and preferably secured in some manner to the top of the tank. Brackets 22, 23 and 24 act as supports for shaft 26 which extends through the drum 18 and is rigidly secured thereto. This drum is provided with spiral grooves accommodating cable 14 and in order that the cable 1 properly fit through the aperture 19, shaft 26 is provided with a threaded section 27. These threads are so pitched that if drum 18 rotates it will be moved longitudinally, and thus cable 14 will freely pass through aperture 19. Shaft 26 has a spline 28 into which loosely fits a key carried by the pinion 29. The brackets 23 and 24 rotatably support the shaft 26 and permit the shaft to move longitudinally therethrough. This shaft also moves longitudinally through the gear wheel on pinion 29, and rotates the pinion at the same time. Pinion 29 continually meshes with the gear wheel 30 which is rigidly secured to the shaft 31 journaled in the lower part of bracket 23 and the bearing sleeve 32. Shaft 31 extends through the closed end of the twistable tube 33 and is rigidly secured to said closed end. This shaft also extends more or less loosely through the sleeve 32 and near its end is rigidly secured to a pulley wheel 34. The twistable tube 33 at the end 35 is soldered or otherwise rigidly secured to an enlargement of sleeve 32. Tube 33 may be of fabric or metal, but must be sufficiently twistable to permit one rotation of shaft 31. A tubular housing 36 loosely surrounds the twistable tube 33 and protects the same, though it does not in any way interfere with the tube's ability to twist. The sleeve 32 is preferably soldered or otherwise rigidly secured in place so that it will not rotate and also to make an oil-tight connection. In this way, as float 16 moves upwardly or downwardly power will be transmitted therefrom to shaft 31 and thence to pulley wheel 34. As the parts are proportioned pulley wheel 34 will rotate one revolution as float 16 moves from one extreme position to the other, namely, from its lowermost position to its highest position or from its highest position to its lowest position. By reason of the pulley 7, members 13 and associated parts, float 16 will not move to the bottom of the tank but will stop a short distance therefrom. Where it stops eight inches from the bottom of the tank 1 float 16 may be so proportioned that when the oil or other liquid has moved four inches toward the upper end thereof a floating movement will begin. In this way the pointer 37 will indicate twelve inches of oil when it ceases to function. As the oil moves upwardly when the tank is filled, pointer 37 will gradually move for indicating the true amount of oil in the tank. Usually this is indicated in feet and inches but may be calibrated in some other form of measurement. As shown in Figure 3 pulley 34 is arranged in a closed housing 38, so that the wire or cable 39 will be protected. This wire or cable extends around pulley 34 between the idler pulleys 40 and 41 through a connecting tube 42, between idler pulleys 43 and 44 and around the driven pulleys 45. The driven pulley 45 is rigidly secured to a shaft 46, which shaft in turn is rigidly secured to the pointer 37 and rotatably mounted in the dial plate 47 and in the sliding carrier 48. This sliding carrier is provided with extensions 49 loosely surrounding the guide rods 50 and 51. Suitable screws 52 secure the plate 47 to the carrier 48, spacing sleeves 53 holding the plate 47 a proper distance from the carrier, as shown in Figure 1. In this way carrier 48, plate 47 and associated parts form a carriage in which the shaft 46 is rotatably mounted. This shaft is rigidly secured to pulley 45 and to pointer 37. The carriage is of an appreciable weight and consequently will always maintain the cable 39 taut while continually taking up any stretch or contraction of the cable by reason of use or change of temperature. In case the cable 39 should stretch, the carriage including shaft 46 would merely move downwardly for the distance of the stretch of the cable, and the pointer would not be rotated. However, whenever pulley 34 is rotated pointer 37 will be correspondingly moved. It will thus be seen that when the float 16 moves upwardly or downwardly pointer 37 will be given a corresponding rotary movement. This will take place regardless of whether the oil is heavy or light, and regardless of whether the tank is swaying back and forth. The gauge which consists of pointer 37 and associated parts is arranged in casing 54 which is preferably provided with a front glass panel 55. These parts may be arranged as shown in the drawing or some other desired point. The dial and associated parts have been shown near the bottom of the tank but they could be arranged near the top or, if desired, above or below the tank. Regardless of the position of these parts the entire gauge structure is so formed that it will function accurately with different kinds of liquid and on board ship where the tank is moved or tossed with the tossing of the ship, after the gauge has been once installed practically no attention need be given to the same, as it would continually function automatically.

What I claim is:—

1. A gauge for liquid-carrying tanks, comprising a pipe adapted to extend substantially from the top to the bottom of the tank interiorly thereof, a float loosely positioned in said pipe, said pipe being open at opposite ends to permit the same level of liquid in the pipe as in the tank, a cable connected with said float, a driving pulley positioned exteriorly of the tank, means operated by said cable for rotating said driving pulley in proportion to the movement of said float, an endless cable acting as a belt mounted on said pulley, a driven pulley operated by the last-mentioned cable, a pointer rigidly connected with said driven pulley and rotated thereby, means for slidably supporting said driven pulley and said pointer and a dial carried by said supporting means positioned to coact with said pointer for indicating the level of liquid in said tank, said dial, driven pulley, supporting means and pointer being supported vertically by said last-mentioned cable whereby these members will take up any stretch on said last-mentioned cable without affecting the driving action in connection with said driven pulley.

2. A tank gauge, comprising a pointer, a driven pulley connected with said pointer and rotating the same, a carriage carrying said pulley, said carriage being movable vertically, said carriage including a dial over which said pointer travels, a cable passing around said pulley and acting as a vertical support for the pulley and carriage whereby the weight of the pulley and carriage acts to maintain said cable taut and also acts to take up any stretch thereof, a driving pulley over which said cable passes, said driving pulley being arranged above the first-mentioned pulley, and means in the tank with which the gauge is associated for rotating said driving pulley in proportion to the rise and fall of the liquid in the tank.

3. A gauge for tanks, including a vertically positioned tube open at both ends, a pair of vertical guiding bars arranged interiorly of said pipe near the lower end thereof, a shaft extending from one of said guiding bars to the other and slidable longitudinally of said bars, a pulley secured to said shaft, a cable passing over said pulley so that one run will be in said pipe and one will be exteriorly of said pipe, a drum at the top end of said pipe over which said cable extends, a float arranged in said pipe and connected to the respective ends of said cable whereby the weight of said pulley maintains said cable taut, while said guiding bars hold the pulley in correct operative position, and means operated by said drum for indicating at a point exteriorly of the tank the position of said float.

4. A tank gauge, comprising a shaft, a sleeve presenting a journal member for one end of said shaft, a twistable tube rigidly secured to the shaft at one end and to said sleeve at the opposite end, a driving pulley connected with the first-mentioned end of said shaft, a driving gear connected with said shaft, means including a float for actuating said driving gear, a dial, a pointer adapted to move over said dial, a support pulley rigidly connected to said pointer and rotatably connected to said dial for supporting the dial and for supporting and actuating said pointer, and a supporting and driving cable supported and operated by said driving pulley, said cable fitting over said supporting pulley for supporting and actuating the same.

5. A tank gauge, including a dial, a pointer adapted to move over said dial, a vertically movable supporting structure for said dial and pointer, means for guiding said supporting structure, dial and pointer in a vertical sliding movement, a pulley carried by said supporting structure and rigidly connected with said pointer for rotating the pointer, an endless cable extending over said pulley, said cable acting to rotate the pulley and pointer when the cable is driven, while the pulley, dial and associated parts due to gravity act to maintain the cable under tension and also act to take up any stretching of the cable, a pulley for driving said cable, a float, and means for translating the upward and downward movement of the float into a rotary movement, said means causing said last-mentioned pulley to be rotated as the float moves.

6. A tank gauge, comprising a float, means for guiding the float, a cable connected with the float and actuated thereby, a drum rotated by said cable as the cable is moved, a driving pulley positioned exteriorly of the tank to which the device is secured, means for connecting the driving pulley with the drum, whereby the driving pulley is rotated in proportion to the rotation of the drum, said means including a shaft secured to said driving pulley, and a twistable protecting tube secured at one end to said shaft for preventing leakage around said shaft, the opposite end of said protecting tube being held stationary with respect to said tank, an endless cable passing over said driving pulley, a second pulley supported and actuated by said endless cable, a pointer connected with said second pulley and actuated thereby, and a dial arranged adjacent said pointer and positioned so that the pointer will move over the dial.

7. A gauge for indicating the level of liquids in tanks, comprising a sliding frame mounted to slide vertically exteriorly of said tank, a dial carried by said frame, a pointer carried by said frame and adapted to move over said dial, a rotating driven pulley rigidly connected with said pointer for actuating the same, a driving cable positioned on said driving pulley and acting as a driving belt therefor and as a vertical support for the sliding frame and parts carried thereby, a driving pulley for supporting and driving said cable, a float positioned in said tank and adapted to be raised and lowered with the liquid in the tank, and means actuated by said float and having a part extending through the side walls of the tank for rotating said driving pulley.

8. A gauge for tanks, including a pipe adapted to be vertically positioned in a tank, said pipe being open at both ends, a pulley arranged at the bottom end of the pipe, a rotatable drum positioned at the top of said pipe, a cable passing over said pulley and said drum, a float connected to the respective ends of said cable, said float being positioned in said pipe, a pointer and dial positioned exteriorly of said tank, and means for translating rotary motion of said drum into a movement for rotating said pointer over said dial, whereby said pointer will move in proportion to the movement of said float, said last-mentioned means including a shaft rotated by said drum and extending to a point exteriorly of the tank, a twistable tube surrounding part of said shaft and having one end secured to said tank at the point where said shaft extends through the tank and the other end secured to said shaft, whereby leakage is prevented, a driving pulley secured to said shaft exteriorly of the tank, and a driving and supporting cable mounted on said driving pulley, and a driven pulley secured to said pointer, said driven pulley and pointer being supported by said cable.

Signed at New York in the county of New York and State of New York this 29th day of March, A. D. 1928.

RICHARD STAR.